Patented Apr. 28, 1931

1,802,347

UNITED STATES PATENT OFFICE

FRANS GEORG LILJENROTH, OF STOCKHOLM, SWEDEN, ASSIGNOR TO KUNSTDUNGER-PATENT-VERWERTUNGS-AKTIENGESELLSCHAFT, OF GLARUS, SWITZERLAND

METHOD OF PRODUCING A MIXTURE OF CALCIUM NITRATE AND AMMONIUM NITRATE

No Drawing. Application filed October 15, 1928, Serial No. 312,699, and in Sweden December 1, 1927.

It has been proposed in producing fertilizers of calcium nitrate to mix the calcium nitrate with a small quantity of ammonium nitrate thus obtaining certain advantages, among others the advantage of a higher percentage of nitrogen in the mixed salt than that of the calcium nitrate alone.

Calcium nitrate may suitably be produced by dissolving calcium carbonate in nitric acid. According to the invention calcium carbonate is used, which is recovered as a by-product in converting calcium sulphate into ammonium sulphate and calcium carbonate by means of ammonia and carbon dioxide. A desired percentage of ammonium sulphate is left in said calcium carbonate when produced and the mixture is then treated with nitric acid. In this reaction the ammonium sulphate present reacts with a corresponding quantity of nitric acid and calcium carbonate according to the equation:

$$(NH_4)_2SO_4 + 2HNO_3 + CaCO_3 = 2NH_4NO_3 + CaSO_4 + CO_2$$

By this method the advantage is obtained that no thorough washing of the calcium carbonate is necessary for the recovery of the ammonium sulphate solution adhering thereto and thus the apparatus as well as the method are simplified.

The solution produced may be separated from the precipitate of calcium sulphate and other insoluble products and be evaporated alone or be evaporated together with them according to the circumstances.

What I claim is:

A method of producing a mixture of calcium nitrate and ammonium nitrate, comprising reacting upon calcium sulphate by means of ammonia and carbon dioxide so as to form a solution of ammonium sulphate and a precipitate of calcium carbonate, separating the main part of the ammonium sulphate solution and reacting upon the calcium carbonate and the remainder of the ammonium sulphate by means of nitric acid.

In testimony whereof I have signed my name.

FRANS GEORG LILJENROTH.